(12) United States Patent
Horn

(10) Patent No.: US 8,600,387 B2
(45) Date of Patent: Dec. 3, 2013

(54) METHOD AND APPARATUS FOR PERFORMING INTRA CLOSED SUBSCRIBER GROUP HANDOVER

(75) Inventor: Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 294 days.

(21) Appl. No.: 13/093,582

(22) Filed: Apr. 25, 2011

(65) Prior Publication Data

US 2012/0100852 A1 Apr. 26, 2012

Related U.S. Application Data

(60) Provisional application No. 61/329,424, filed on Apr. 29, 2010.

(51) Int. Cl.
*H04W 36/00* (2009.01)

(52) U.S. Cl.
USPC ............ 455/436; 455/437; 455/438; 455/439

(58) Field of Classification Search
USPC .......................... 455/436–440; 370/331–333
See application file for complete search history.

(56) References Cited

U.S. PATENT DOCUMENTS

| | | | | |
|---|---|---|---|---|
| 2011/0105119 A1* | 5/2011 | Bienas et al. | ................ | 455/436 |
| 2011/0105123 A1* | 5/2011 | Lee et al. | ...................... | 455/436 |
| 2011/0105127 A1* | 5/2011 | Wu | ............................... | 455/438 |
| 2011/0171915 A1* | 7/2011 | Gomes et al. | ................... | 455/73 |
| 2011/0171953 A1* | 7/2011 | Faccin et al. | .............. | 455/426.1 |

FOREIGN PATENT DOCUMENTS

| | | |
|---|---|---|
| EP | 2249602 A1 | 11/2010 |
| KR | 20100092742 A | 8/2010 |
| WO | WO2009022976 A1 | 2/2009 |
| WO | WO2009095970 A1 | 8/2009 |
| WO | WO2010032940 A2 | 3/2010 |

OTHER PUBLICATIONS

Huawei: "Discussion of Inbound Handove "3GPP Draft; R3-090804 Discussion of Inbound Handover_Revo, 3rd Generation Partnership Project (3GPP), Mobile Competence Centre ; 650, Route Des Lucioles ; F-06921 Sophia-Antipolis Cedex; France, no. Seoul, Korea; 20090318, Mar. 18, 2009, XP050341183 [retrieved on Mar. 18, 2009].
International Search Report and Written Opinion/13 PCT/US2011/034685—ISA/EPO—Aug. 5, 2011.

(Continued)

*Primary Examiner* — Temica M Beamer
(74) *Attorney, Agent, or Firm* — François A. Pelaez

(57) ABSTRACT

Methods and apparatuses are provided that facilitate initiating an intra-closed subscriber group (CSG) handover. Access points in the same or similar CSG can make determinations regarding one or more devices without requiring information from the devices. An access point in a closed access mode can assume a device to which it communicates is a member of the CSG, and can provide such information to a target access point of the same CSG operating in a hybrid access mode, and the hybrid access mode access point can determine to allow member level access to the device. Similarly, where the target access point operates in a closed access mode, a source access point in the same CSG can determine whether to initiate handover of the device to the target access point based at least in part on CSG membership information for the device.

45 Claims, 14 Drawing Sheets

(56) References Cited

OTHER PUBLICATIONS

Mitsubishi Electric: "Home eNodeBs and Access Policy Enforcement," 3GPP TSG RAN WG3 Meeting #57, R3-071588, Athens, Greece, Aug. 20-24, 2007, XP002576348.

QUALCOMM Europe: "Access control for in-bound handover to a CSG cell" 3GPP Draft; R3-091025, 3rd Generation Partnership Project (3GPP), Mobile Competence Centre ; 650, Route Des Lucioles ; F-06921 Sophia-Antipolis Cedex; France, no. San Francisco, USA; 20090429, Apr. 29, 2009, XP050341410 [retrieved on Apr. 29, 2009] paragraphs 1 to 5.

* cited by examiner

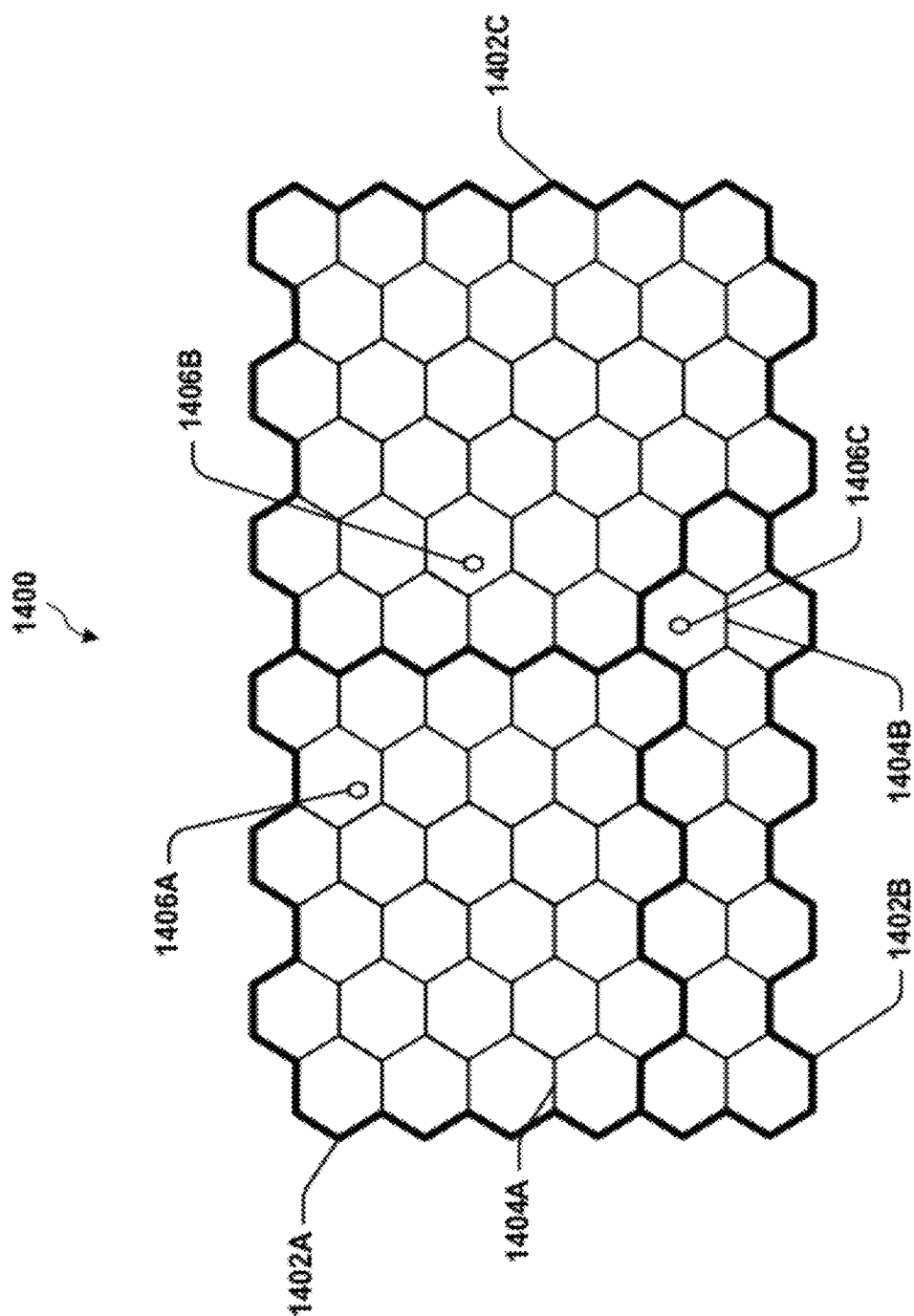

METHOD AND APPARATUS FOR PERFORMING INTRA CLOSED SUBSCRIBER GROUP HANDOVER

CLAIM OF PRIORITY UNDER 35 U.S.C. §119

The present application for patent claims priority to Provisional Application No. 61/329,424 entitled "INTRA CLOSED SUBSCRIBER GROUP HANDOVER FOR CELLS WITH DIFFERENT ACCESS MODES" filed Apr. 29, 2010, and assigned to the assignee hereof and hereby expressly incorporated by reference herein.

BACKGROUND

1. Field

The following description relates generally to wireless network communications, and more particularly to performing handover.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

To supplement conventional base stations, additional base stations can be deployed to provide more robust wireless coverage to mobile devices. For example, wireless relay stations and low power base stations (e.g., Home NodeBs or Home eNBs, collectively referred to as H(e)NB, femto access points, femtocells, picocells, microcells, etc.) can be deployed for incremental capacity growth, richer user experience, in-building or other specific geographic coverage, and/or the like. In some configurations, such low power base stations are connected to the Internet and the mobile operator's network via broadband connection (e.g., digital subscriber line (DSL) router, cable or other modem, etc.). Some H(e)NBs associate with a closed subscriber group (CSG) access for restricting access (or providing an improved level of access) to certain devices or related users that are members of the CSG.

In addition, H(e)NBs can operate using varying levels of restriction, such as using an open access mode to allow access to substantially any device, using a closed access mode to restrict access to devices that are members of the CSG, or using a hybrid access mode to allow at least some level of access or service to devices that are not members of the CSG while allowing an increased level of access or service to devices that are members of the CSG. Moreover, a plurality of H(e)NBs can be associated with a given CSG and can thus advertise parameters of the CSG (e.g., at an enterprise, retail center, etc.). In this regard, a device can travel throughout a coverage area and can be handed over to one or more H(e)NBs in the CSG.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, the present disclosure describes various aspects in connection with performing handover of one or more devices among access points associated with providing restricted access. Where the access points are members of a similar restricted group, the access points can communicate parameters of the one or more devices to facilitate handover. For example, a membership status of the one or more devices with the access points can be utilized in initiating handover from a source access point to a target access point. Where a device is allowed to access the source access point, the source access point can communicate the membership status and/or one or more other parameters to the target access point over an interface that facilitates access point communication. In one example, the target access point can then verify whether the device is allowed access at the target access point based on membership status and/or other parameters. Thus, such information need not be obtained from the device.

According to an example, a method for performing intra-closed subscriber group (CSG) handover is provided. The method includes advertising an association with a CSG and determining that a target cell is associated with the CSG. The method further includes initiating a handover of a device to an access point that provides the target cell based at least in part on the determining that the target cell is associated with the CSG.

In another aspect, an apparatus for performing intra-CSG handover is provided. The apparatus includes at least one processor configured to transmit a signal that advertises an association with a CSG and determine that a target cell is associated with the CSG. The at least one processor is further configured to initiate handover of a device to a target access point that provides the target cell based at least in part on the target cell being associated with the CSG. The apparatus also includes a memory coupled to the at least one processor.

In yet another aspect, an apparatus for performing intra-CSG handover is provided that includes means for transmitting a signal that advertises an association with a CSG and means for determining that a target cell is associated with the CSG. The apparatus further includes means for initiating a handover of a device to a target access point that provides the target cell based at least in part on determining the target cell is associated with the CSG.

Still, in another aspect, a computer-program product for performing intra-CSG handover is provided including a computer-readable medium having code for causing at least one computer to transmit a signal that advertises an association with a CSG and code for causing the at least one computer to determine whether a target cell is associated with the CSG. The computer-readable medium further includes code for causing the at least one computer to initiate handover of a device to a target access point that provides the target cell based at least in part on the determining whether the target cell is associated with the CSG.

Moreover, in an aspect, an apparatus for performing intra-CSG handover is provided that includes a CSG associating component for transmitting a signal that advertises an association with a CSG and a CSG determining component for determining whether a target cell is associated with the CSG. The apparatus further includes a handover component for initiating a handover of a device to a target access point that provides the target cell based at least in part on the determining whether the target cell is associated with the CSG.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 14 is a schematic diagram of an aspect of a coverage map having several defined tracking areas.

DETAILED DESCRIPTION

Figure 1:
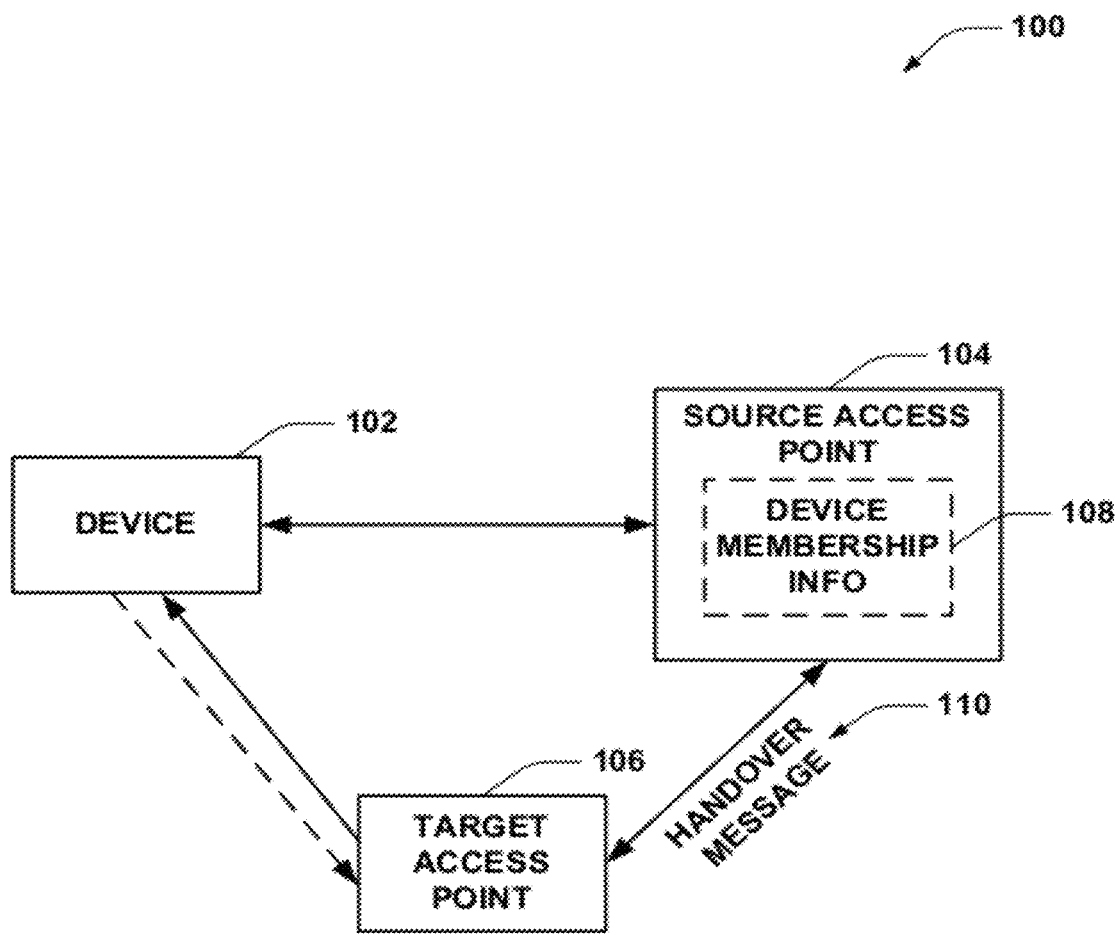
FIG. 1 is a block diagram of an aspect of a system that facilitates performing intra-closed subscriber group (CSG) handover.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, devices can be handed over among access points associated with a restricted group at least in part by utilizing membership information of the devices for generating one or more handover messages communicated between access points. In one example, the source access point can determine that the target access point is in the same restricted group. As such, membership information at the source access point can be verified (e.g., compared with restricted group information received regarding a target access point) to determine whether to initiate handover of a device to the target access point. In another example, membership information of the device can be provided to the target access point as part of initiating handover from the source access point. In either example, the membership information regarding the restricted group can be verified, compared, and/or communicated between source and target access points without requiring resources from the device.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, illustrated are several nodes of a sample communication system 100. For illustration purposes, various aspects of the disclosure are described in the context of one or more devices and access points that communicate with one another. It is to be appreciated, however, that aspects herein may be applicable to other types of apparatuses or other similar apparatuses that are referenced using other terminology. For example, access points can be referred to or implemented as base stations, eNodeBs (eNB), Home Node Bs (e.g., in UMTS) or Home eNBs (e.g., in LTE) collectively referred to as H(e)NBs, femtocell or picocell access points, mobile base stations, relay nodes, hot-spots, routers, gateways, etc., while devices may be referred to or implemented as user equipment (UE), mobile devices, access terminals, modems (or other tethered devices), or may be a portion thereof, and so on.

Device 102 can receive one or more services (e.g., network connectivity) via idle-mode or active-mode communications with a source access point 104. Device 102 can be a wired or wireless device installed within and/or traveling throughout a coverage area provided by source access point 104 and/or one or more other access points of the system 100 (e.g., target access point 106). For example, at various points in time, device 102 can connect to source access point 104 or some other access point in the system 100 (e.g., target access point 106) over a wired or wireless interface. The access points 104 and 106 can additionally communicate with one another using a wired or wireless backhaul interface, such as an X2 interface.

In an example, device 102 can communicate with source access point 104 and can reselect or be handed over to target access point 106. In one example, reselection or handover can refer to moving the communication session of device 102 from source access point 104 to target access point 106, which can be a seamless experience for a user of device 102. In one example, the handover can include one or more of the following actions: device 102 can establish a communication session with source access point 104; device 102 can periodically measure one or more signals received from one or more access points and generate a measurement report comprising the measurements, identifiers of the access points received in the signals, and/or other parameters based on the signals; source access point 104 can receive the measurement report and can determine whether a measurement (e.g., a signal-to-noise ratio (SNR), etc.) related to another access point, such as target access point 106, is at least a threshold level over that of source access point 104 (e.g., where the threshold is a relative threshold, an absolute threshold, etc.); if so, source access point 104 can transmit a handover message to the target access point 106, wherein the handover message may include at least one or more parameters relating to device 102; source access point 104 can then transmit a command or other notification to device 102 related to handing over the communication session of device 102. In this example, target access point 106 can receive the handover message and establish a context for device 102 to continue the communication session, and can receive one or more messages from device 102 following handover. In an example, reselection can be performed for a device in idle-mode, and relocation or handover can refer to a similar procedure performed for devices in active-mode.

In some cases, device 102 can access a restricted group access point (e.g., source access point 104 and target access point 106) associated with a wireless cell set. In general, a wireless cell set comprises a set of one or more cells (e.g., provided by at least one access point, such as access point 104 and/or 106) having a defined relationship. An example of a wireless cell set is a closed subscriber group (CSG). For convenience, the discussion that follows may simply refer to the term CSG, rather than the more general term wireless cell set. It should be appreciated, however, that the described concepts may be applicable to other types of defined sets or groups (e.g., restricted groups) of wireless cells or other similar entities. In this regard, a restricted group access point can provide access to devices that are members of the restricted group, while denying access to non-member devices. In another example, restricted group access points can operate in a hybrid access mode additionally providing a limited level of access to non-members, to which aspects described herein can apply as well. In addition, it is to be appreciated that an access point, such as access point 104 and/or 106, can provide one or more cells within which devices can communicate with the access point. Thus, for example, a cell provided by an access point having a hybrid access mode can be referred to as a hybrid cell.

In an example, source access point 104 and target access point 106 can be associated with the same CSG (e.g., at an enterprise, retail center, etc.). In this regard, for example, source access point 104 and target access point 106 can advertise a similar CSG identifier (e.g., in broadcast signals transmitted in one or more provided cells), which can be obtained and utilized by device 102 and/or other devices to determine whether to reselect to access point 104 and/or 106 in the cell (e.g., based at least in part on CSG membership of the device 102). In addition, for example, source access point 104 and/or target access point 106 can each implement an open access mode, closed access mode, or hybrid access mode, etc. for one or more cells. In an example, device 102 can communicate with source access point 104, and source access point 104 can determine whether to handover device 102 to target access point 106. As described, since source access point 104 and target access point 106 are associated with the same CSG, source access point 104 can utilize device membership information 108, e.g., information about CSGs to which device 102 is a member, in initiating handover to target access point 106.

For example, where device 102 communicates with source access point 104 in a cell provided using a closed access mode, upon determining to handover device 102 to a cell of target access point 106, source access point 104 can determine that the target access point 106 is associated with the same CSG as source access point 104. In one example, this can be determined based at least in part on comparing a CSG identifier advertised by target access point 106 (e.g., as received from the device 102 in a measurement report, and/or the like) to a CSG identifier advertised by source access point 104. In addition, for example, source access point 104 can generate device membership information 108 specifying that device 102 is a member of the CSG. For example, source access point 104 can generate device membership information 108 based at least in part on at least one of receiving device membership information 108 from device 102, obtaining device membership information 108 from access control functions previously performed by a core network (not shown) related to source access point 104, and/or the like. Source access point 104 can transmit handover message 110 to target access point 106, which can include the device membership information 108. It is to be appreciated that handover message can be a handover message, a relocation message, and/or a similar message for related to moving device 102 communications to another access point. Where the cell of target access point 106 is a hybrid cell, for example, target access point 106 can verify that the device membership information 108 includes membership to the CSG associated with the hybrid cell in order to determine whether to provide member level or non-member level access to device 102 in the cell.

In another example, where device 102 communicates with source access point 104 in a cell provided using a hybrid access mode, source access point 104 can verify whether device 102 is a member of the CSG as part of determining whether to initiate a handover to target access point 106 (e.g., where target access point 106 provides a closed access mode). For example, this can include verifying device membership information 108, which can be generated as described and/or received from one or more core network nodes (e.g., in a CSG membership status or similar message from a mobility management entity (MME) or other core network node, etc.), and comparing to the CSG of target access point 106 to determine whether device 102 is allowed to access the CSG. If so, source access point 104 can transmit handover message 110 to target access point 106. If not, source access point 104 can refrain from initiating handover (e.g., transmitting the handover message 110) where the target access point 106 operates in the closed access mode.

Figure 2:
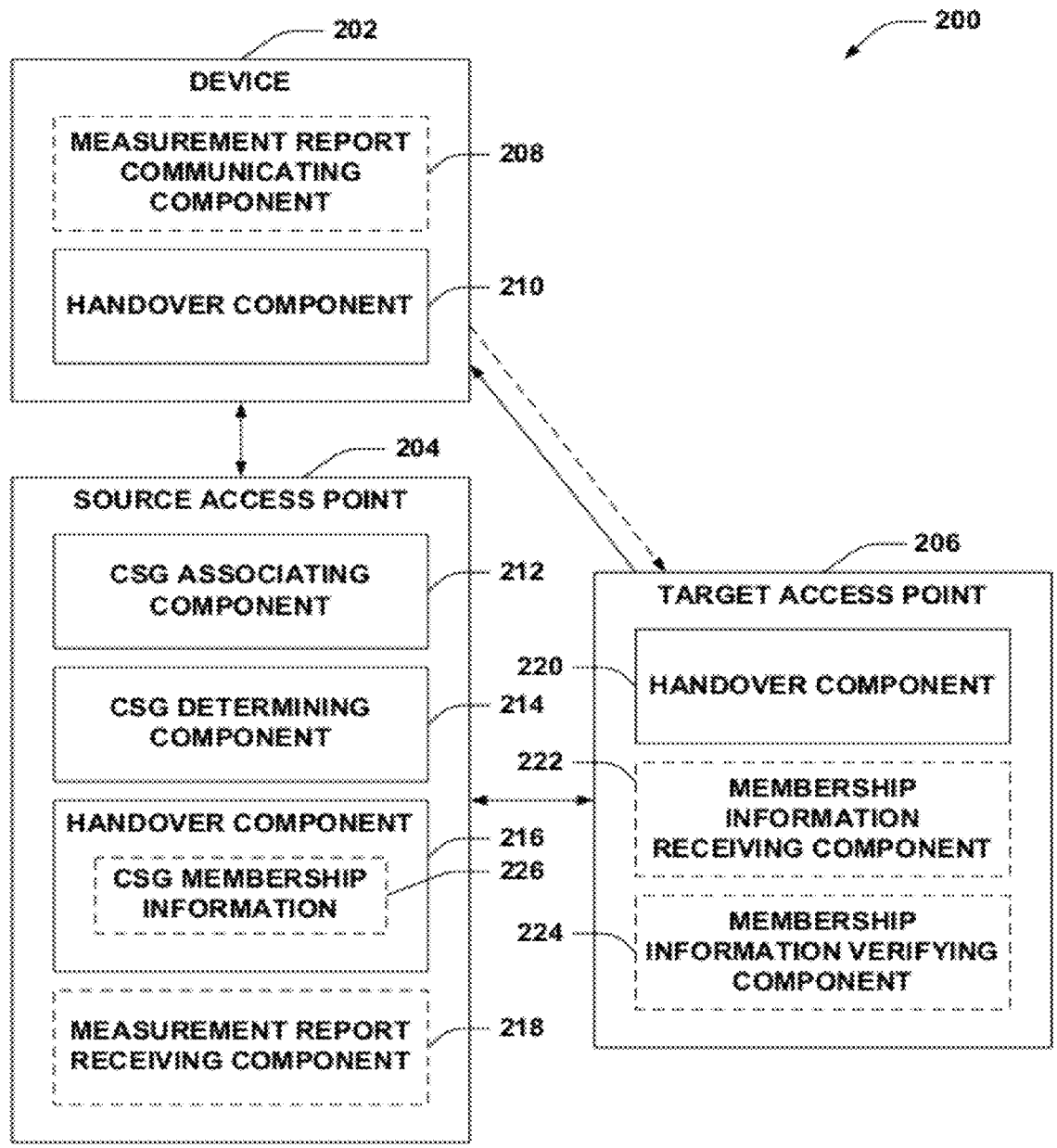
FIG. 2 is a block diagram of an aspect of a system for handing over device communications to an access point in a same or similar CSG.

Turning to FIG. 2, an example wireless communication system 200 is illustrated that facilitates intra-CSG handover. System 200 can include a device 202 that can communicate with one or more access points to receive access to a wireless network, a source access point 204 that provides restricted access to device 202 and/or one or more other devices, and a target access point 206 from which device 202 can receive one or more broadcast signals. In one example, device 202 can be a UE, modem (or other tethered device), a portion thereof, and/or the like, and access points 204 and 206 can each be a femtocell, picocell, H(e)NB, or similar access point, a portion thereof, etc., as described. In addition, source access point 204 and target access point 206 can provide restricted access to one or more devices. In addition, though not shown, source access point 204 and target access point 206 can comprise similar components to provide similar functionality as described herein. Also, for example, source access point 204 and target access point 206 can communicate using an X2 or similar interface.

Device 202 can comprise an optional measurement report communicating component 208 for generating and transmitting measurement reports to a source access point, and a handover component 210 for performing one or more procedures related to handing over communications from a source access point to a target access point. Source access point 204 can comprise a CSG associating component 212 for indicating an association of source access point 204 with a CSG, and a CSG determining component 214 for discerning whether a target access point is associated with the same or a similar CSG. Source access point 204 additionally comprises a handover component 216 for performing one or more procedures related to handing over communication with a device to the target access point, and an optional measurement report receiving component 218 for receiving one or more measurement reports from the device. Target access point 206 comprises a handover component 220 for performing one or more procedures related to handing over a device from a source access point, an optional membership information receiving component 222 for obtaining CSG membership information of the device, and an optional membership information verifying component 224 for determining whether the device is a member of the CSG associated with target access point 206 based at least in part on the CSG membership information.

According to an example, CSG associating component 212 can indicate association of source access point 204 with a CSG. In one example, CSG associating component 212 can broadcast a CSG identifier, an access mode indicator that can specify a CSG access mode (e.g., closed, hybrid, etc.), and/or the like, in one or more signals (e.g., system information block broadcast signals) using a transmitter. In an example, CSG associating component 212 can comprise the transmitter. In another example, CSG associating component 212 can include a physical cell identifier (PCI) in the broadcast signal that indicates CSG association, can scramble the broadcast signal according to a primary scrambling code (PSC) that indicates CSG association, and/or the like. In addition, source access point 204 can communicate with device 202 to provide wireless network access thereto. Handover component 216, in one example, can determine to handover device 202 communications to target access point 206. In this example, CSG determining component 214 can determine whether target access point 206 is associated with the same or similar CSG as source access point 204. For example, CSG determining component 214 can obtain a CSG identifier related to target access point 206 (e.g., in a measurement report from device 202, in signaling from target access point 206, in signaling from one or more other devices, etc.), and can compare to an identifier of the advertised CSG.

Where CSG determining component 214 determines that target access point 206 is associated with the same CSG, handover component 216 can initiate handover of device 202 to target access point 206 based at least in part on CSG membership information 226 stored and/or generated for device 202. For example, this can include transmitting a relocation request or a handover request or other message over an X2 or similar interface between source access point 204 and target access point 206. Moreover, for example, handover component 216 can determine an access mode of target access point 206, and can initiate the handover further based at least in part on the access mode (e.g., hybrid, closed, etc.). For example, where target access point 206 communicates in a hybrid access mode, handover component 216 can generate CSG membership information 226 for device 202 that specifies whether the device 202 is a member of the CSG, and can include the CSG membership information 226 in the relocation or handover request so the target access point 206 can determine a level of access to provide to the device 202. Where target access point 206 communicates in a closed access mode, handover component 216 can determine whether or not to initiate the handover based at least in part on the CSG membership information 226.

In one example, handover component 216 can generate at least a portion of the CSG membership information 226 for device 202. In an example, the generated CSG membership information 226 can include a CSG identifier of target access point 206, an access mode indicator for target access point 206, and/or the like, based at least in part on a self-organizing network (SON) technique using a received identifier of target access point 206, such as automatic neighbor relation (ANR), configuration through operation, administration, management (OAM), etc. In another example, handover component 216 can receive at least a CSG identifier of target access point 206 from device 202 (e.g., in a measurement report or otherwise). In either case, CSG membership information 226 can include a CSG identifier, an access mode at source access point 204 and/or target access point 206 (e.g., in the related cells), an indicator of whether device 202 is a member of the CSG, and/or the like, as described. In one example, the access mode of the target access point 206 can be determined by device 202 and/or source access point 204 based at least in part on a PSC and/or PCI associated with the target access point 206 (e.g., as received in or determined from the signal broadcasted from target access point 206).

Where target access point 206 provides a hybrid cell to which device 202 is being handed over, handover component 216 can include the CSG membership information 226 in a handover message transmitted to target access point 206, as described. Membership information receiving component 222 can obtain the CSG membership information 226 from the handover message. In this example, membership information verifying component 224 can determine whether device 202 is a member of the CSG based on the CSG membership information 226. For example, membership information verifying component 224 can determine whether CSG membership information 226 indicates that device 202 is a member of the CSG. In another example, membership information verifying component 224 can determine whether a CSG identifier specified in the CSG membership information 226 is the same as or similar to a CSG identifier advertised by target access point 206. If so, in either and/or both examples, handover component 220 can determine to provide member level access to device 202. Otherwise, handover component 220 can determine to provide non-member level access to the device 202. In yet another example, membership information verifying component 224 can compare the received CSG membership information 226 to CSG membership status received for device 202 (e.g., from an MME or other core network component) to determine whether device 202 is a member of the CSG.

In another example, where target access point 206 communicates in a closed access mode, handover component 216 can determine whether to handover device 202 communications to target access point 206 based at least in part on the CSG membership information 226. For example, handover component 216 can verify that device 202 is a member of the CSG advertised by source access point 204 and target access point 206 based at least in part on the CSG membership information 226. As described, CSG membership information 226 can be at least one of received from one or more network components (e.g., as CSG membership status from an MME, as handover information from a different access point, etc.) when device 202 establishes a connection with source access point 204, generated based at least in part on information received from the one or more network components, generated based at least in part on information received from device 202, and/or the like. Where handover component 216 determines that device 202 is a member of the CSG based at least in part on the CSG membership information 226, handover component 216 can initiate a handover of device 202 to target access point 206. If, however, handover component 216 determines that device 202 is not a member of the CSG, handover component 216 can refrain from initiating the handover to target access point 206.

In various aspects described above, device 202 can communicate measurement reports to source access point 204 to facilitate the relocation and/or handover. In an example, measurement report communicating component 208 can periodically generate a measurement report comprising measurements of signals received at device 202 from one or more access points, such as source access point 204, target access point 206, and/or other access points, as described. In an example, the measurement report can include a SNR, CSG identifier, access mode indicator, access point identifier (e.g., PCI), etc. related to target access point 206 and/or other access points. Measurement report communicating component 208 can transmit the measurement report to source access point 204.

In this example, measurement report receiving component 218 can obtain the measurement report, and handover component 216 can determine whether to consider target access point 206 for handover of device 202 communications based at least in part on the measurement report (e.g., where an SNR or other metric of target access point 206 is at least a relative or absolute threshold level over that of source access point 204, etc., as described). If so, CSG determining component 214 can determine a CSG identifier and/or a access mode indicator of target access point 206 (e.g., and/or the related cell) based at least in part on the measurement report, as described, and can determine that the target access point 206 is a member of the CSG advertised by source access point 204. Handover component 216 can then initiate handover of device 202 communications based at least in part on an access mode of target access point 206, CSG membership information 226, etc., as described. In one example, the CSG membership information 226 can include one or more parameters from the measurement report.

Figure 3:
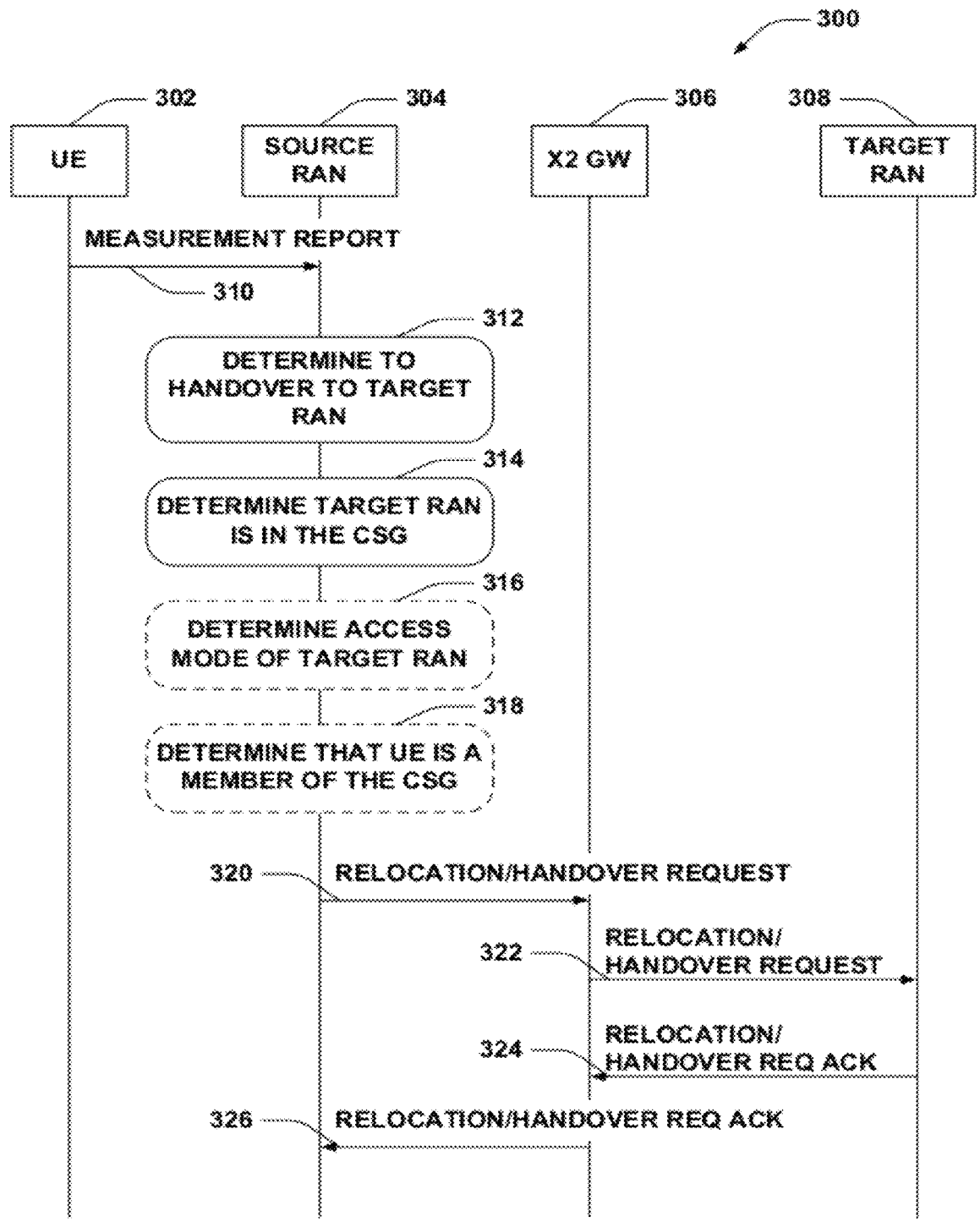
FIG. 3 is an example message flow diagram of an aspect of performing intra-CSG handover.

Referring to FIG. 3, an example message flow diagram of a system 300 is illustrated for facilitating intra-CSG handover. System 300 comprises a UE 302 that communicates with a source radio access network (RAN) 304, which can be or include one or more access points (e.g., H(e)NB, etc.) for accessing the source RAN. System 300 also comprises an X2 gateway (GW) 306 that facilitates communicating between source RAN 304 and a target RAN 308 over an X2 interface. It is to be appreciated that X2 GW 306 can be optional such that source RAN 304 can communicate directly with target RAN 308 (e.g., using the X2 interface directly without an X2 GW 306), in an example. In addition, for example, UE 302 can be communicating with source RAN 304 to receive access to a wireless network, as described. UE 302 can generate and transmit a measurement report 310 to source RAN 304 for performing relocation, handover, etc. Source RAN 304 can receive the measurement report 310 and can determine to handover to target RAN at 312. As described, this can include determining that the target RAN has radio conditions that are at least a relative or absolute threshold level over conditions at source RAN 304 (e.g., SNR, etc.).

In addition, for example, source RAN 304 can determine that the target RAN is in the CSG of source RAN 304 at 314. Based on this determination, for example, source RAN 304 can make additional determinations for initiating handover to target RAN 308, as described. In an example, source RAN 304 can optionally determine an access mode of the target RAN 308 at 316 (e.g., whether a hybrid access mode, closed access mode, etc.). For example, where the access mode is determined to be a closed access mode, source RAN 304 can also optionally determine that UE 302 is a member of the CSG at 318. Though shown as a sequence of steps, it is to be appreciated that determining to handover to the target RAN at 312, determining the target RAN is in the CSG at 314, determining an access mode of the target RAN at 316, and determining that the UE is a member of the CSG at 318, can occur in different orders in determining whether and/or how to handover UE 302, as described. Thus, in this example, source RAN 304 can initiate relocation/handover to target RAN 308 by transmitting a relocation/handover request 320, as described. For example, if it is determined that the UE is not a member of the CSG, source RAN 304 can refrain from transmitting the relocation/handover request 320.

X2 GW 306 can obtain the relocation/handover request 320 and can forward the relocation/handover request 322 to target RAN 308. Target RAN 308 can transmit a relocation/handover request acknowledgement 324 to X2 GW 306, which can forward the relocation/handover request acknowledgement 326 to source RAN 304. For example, as described, target RAN 308 can create a context, etc., for UE 302 to facilitate the relocation/handover. In another example, if source RAN 304 determines the access mode of target RAN at 316 to be a hybrid access mode, source RAN 304 can include CSG membership information related to UE 302 in relocation/handover request 320, as described. Thus, target RAN 308 can verify that UE 302 is a member of the CSG to determine whether to provide member or non-member level access thereto, as described previously.

Referring to FIGS. 4-7, example methodologies relating to providing intra-CSG handover are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Figure 4:
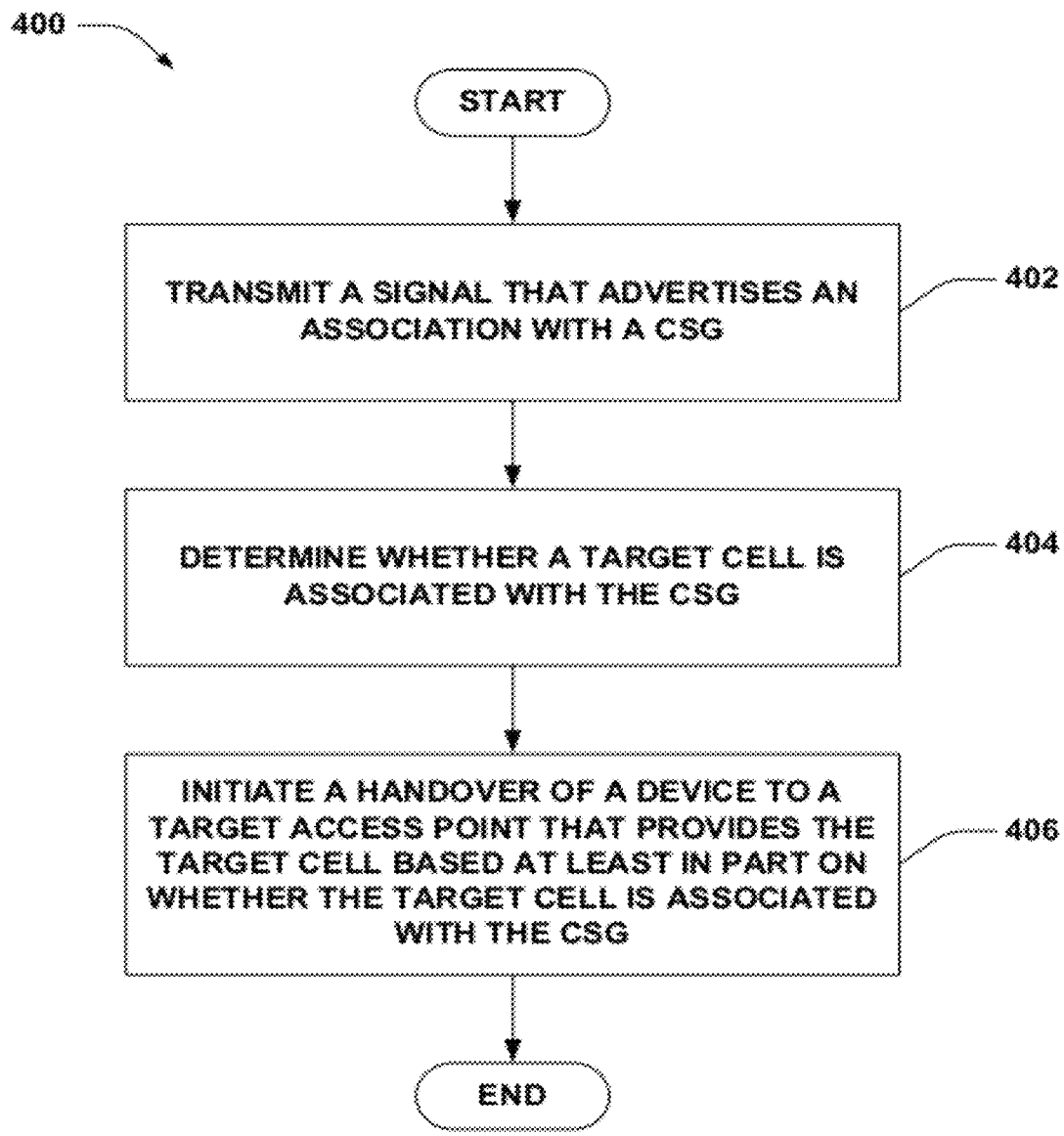
FIG. 4 is a flow chart of an aspect of a methodology for initiating handover based at least in part on CSG membership of an access point.

Referring to FIG. 4, an example methodology 400 is displayed that facilitates initiating a handover to a cell in a similar CSG. At 402, a signal that advertises an association with a CSG can be transmitted. As described, this can include broadcasting a signal that includes an identifier of a CSG, an access mode indicator, and/or the like. At 404, it can be determined whether a target cell is associated with the CSG. For example, this can be determined based at least in part on receiving an indication of possible handover to the target cell (e.g., in a measurement report received from a device, etc.), which can include a CSG identifier, etc., that can be verified as described. At 406, a handover of a device can be initiated to a target access point that provides the target cell based at least in part on whether the target cell is associated with the CSG. As described, the handover can be initiated over an X2 interface and can include initiating the handover based at least in part on determining an access mode in the target cell, providing CSG membership information of the device to the target access point in one or more messages related to initiating the handover based on the access mode, and/or the like.

Figure 5:
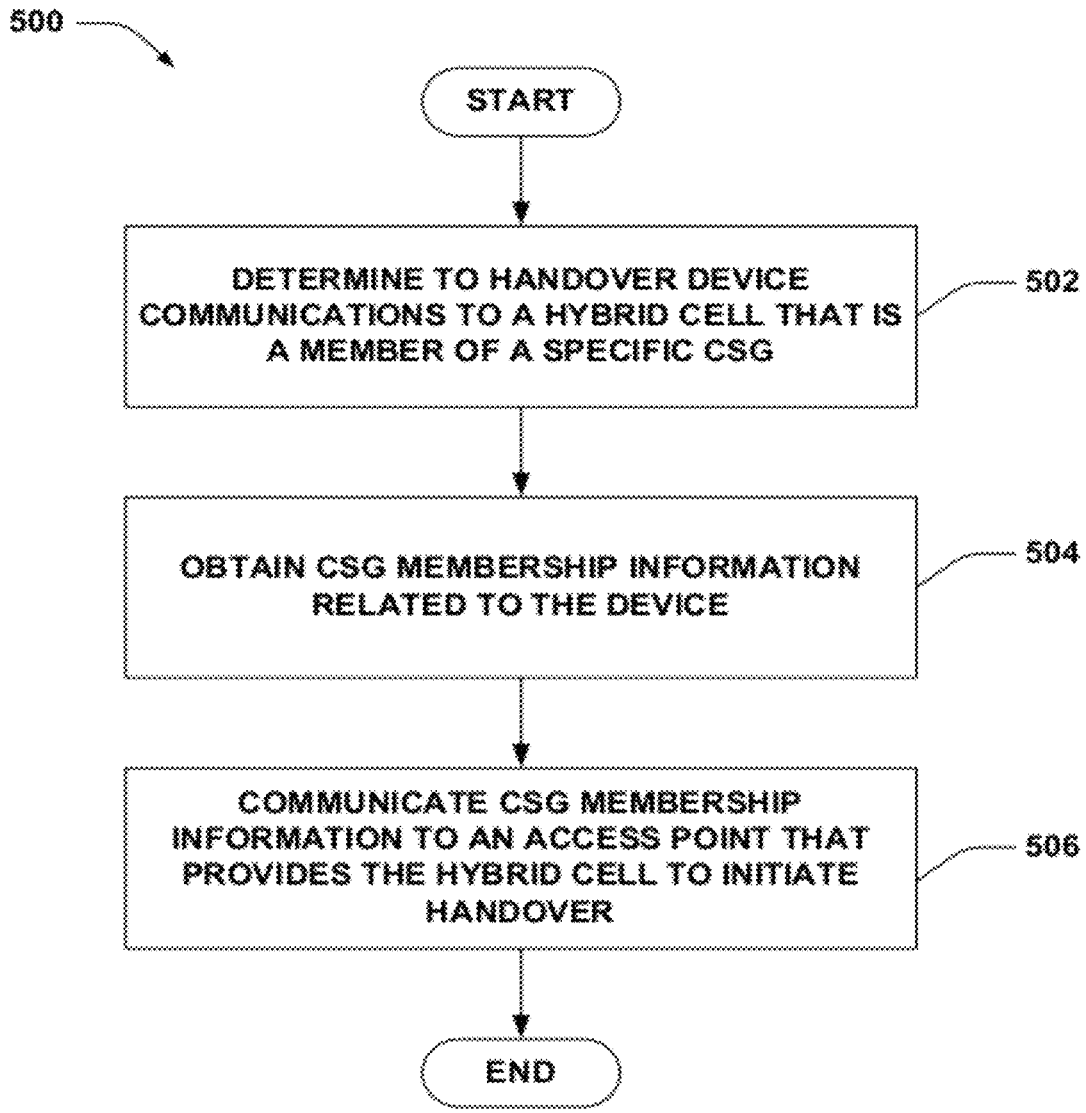
FIG. 5 is a flow chart of an aspect of a methodology that communicates device CSG membership information in intra-CSG handover.

Turning to FIG. 5, an example methodology 500 for initiating a handover to a hybrid cell in a similar CSG is illustrated. At 502, it can be determined to handover device communications to a hybrid cell that is a member of a specific CSG. As described, for example, the specific CSG can be similar to a CSG advertised in one or more broadcast signals. In addition, for example, it can be determined to handover device communications based at least in part on a measurement report received from the device. Moreover, as described, the measurement report can include an identifier of the CSG, which can be compared to an advertised CSG. At 504, CSG membership information related to the device can be obtained. For example, this can include determining the CSG membership information based at least in part on information received from the device, a CSG membership status received from a core network, one or more SON techniques to retrieve CSG membership information regarding an access point that provides the hybrid cell, and/or the like. At 506, CSG membership information can be communicated to an access point that provides the hybrid cell to initiate handover. For example, the CSG membership information can be communicated over an X2 interface (e.g., in a relocation/handover request), and can include an indicator specifying whether the device is a member of an indicated CSG, and/or the like. The target access point can utilize the information (e.g., and/or other information) to determine whether to provide member level or non-member level access to the device in the hybrid cell, as described.

Figure 6:
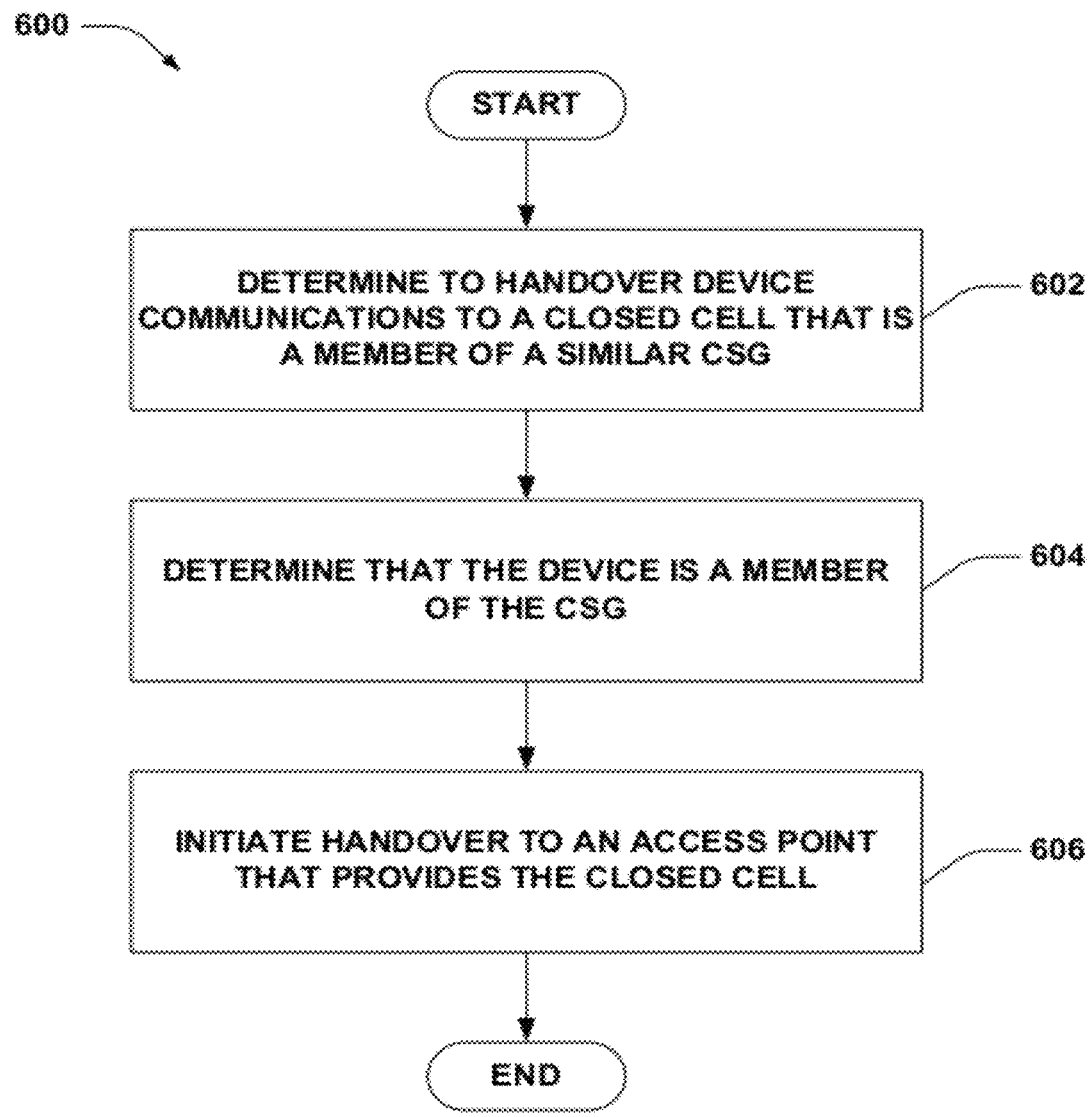
FIG. 6 is a flow chart of an aspect of a methodology for initiating an intra-CSG handover.

Referring to FIG. 6, an example methodology 600 is shown for initiating a handover to a closed cell in a similar CSG. At 602, it can be determined to handover device communications to a closed cell that is a member of a specific CSG. As described, for example, the specific CSG can be similar to a CSG advertised in one or more broadcast signals. In addition, for example, it can be determined to handover device communications based at least in part on a measurement report received from the device. Moreover, as described, the measurement report can include an identifier of the CSG, which can be compared to an advertised CSG. At 604, it can be determined that the device is a member of the CSG. For example, this can include assuming such based on access previously allowed to the device, verifying a CSG membership status received for the device, and/or the like, as described. At 606, handover can be initiated to an access point that provides the closed cell. This is based on determining that the device is a member of the CSG. As described, for example, the handover can be initiated over an X2 interface to the target access point.

Figure 7:
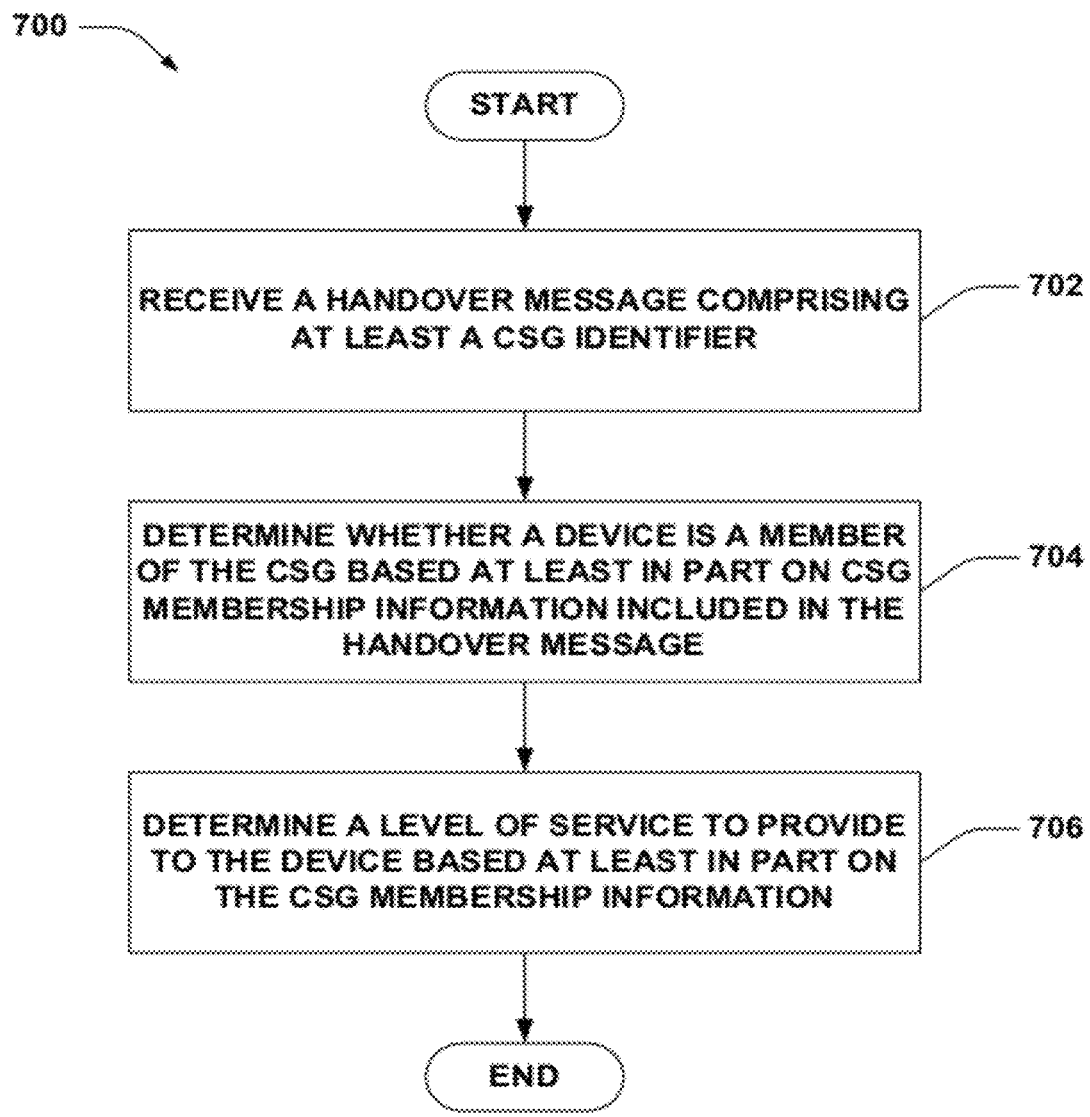
FIG. 7 is a flow chart of an aspect of a methodology for verifying CSG membership information for determining a level of access for a device.

Turning to FIG. 7, an example methodology 700 is illustrated for determining an access level to provide to a device. At 702, a handover message comprising at least a CSG identifier can be received. For example, the handover message can be received over an X2 interface from a source access point, and can be a relocation/handover request, and/or the like. At 704, it can be determined whether a device is a member of the CSG based at least in part on CSG membership information included in the handover message. For example, the CSG membership information can include an indication of whether the device is a member of the CSG. At 706, a level of service to provide to the device can be determined based at least in part on the CSG membership information. Thus, for example a hybrid cell can be provided, and the device can be allowed member or non-member level access based on the CSG membership information, as described.

It will be appreciated that, in accordance with one or more aspects described herein, inferences can be made regarding determining device membership information, determining whether the device is a member of the CSG, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
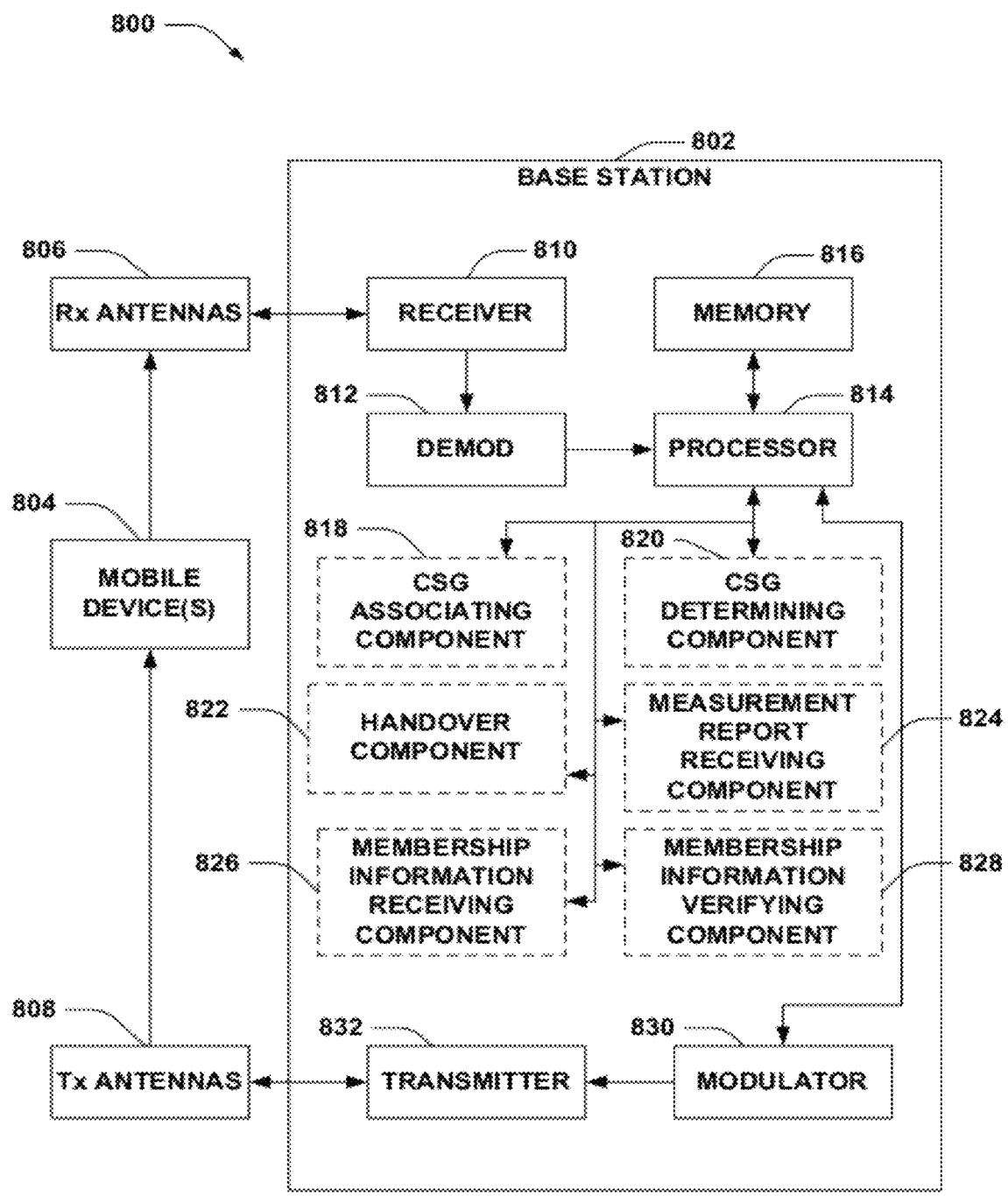
FIG. 8 is a block diagram of an aspect of a system for performing intra-CSG handover.

FIG. 8 is an illustration of a system 800 that facilitates communicating with one or more devices using wireless communications. System 800 comprises a base station 802, which can be substantially any base station (e.g., a small base station, such as a femtocell, picocell, etc., mobile base station . . . ), a relay, etc., having a receiver 810 that receives signal(s) from one or more mobile devices 804 through a plurality of receive antennas 806 (e.g., which can be of multiple network technologies, as described), and a transmitter 832 that transmits to the one or more mobile devices 804 through a plurality of transmit antennas 808 (e.g., which can be of multiple network technologies, as described). In addition, in one example, transmitter 832 can transmit to the mobile devices 804 over a wired front link. Receiver 810 can receive information from one or more receive antennas 806 and is operatively associated with a demodulator 812 that demodulates received information. In addition, in an example, receiver 810 can receive from a wired backhaul link. Demodulated symbols are analyzed by a processor 814. Processor 814 can be a processor dedicated to analyzing information received by receiver 810 and/or generating information for transmission by a transmitter 832, a processor that controls one or more components of base station 802, and/or a processor that both analyzes information received by receiver 810, generates information for transmission by transmitter 832, and controls one or more components of base station 802.

Base station 802 can additionally comprise memory 816 that is operatively coupled to processor 814 and that can store data to be transmitted, received data, information related to available channels, data associated with analyzed signal and/or interference strength, information related to an assigned channel, power, rate, or the like, and any other suitable information for various aspects described herein (e.g., CSG membership information, etc.). Memory 816 can additionally store protocols and/or algorithms associated with aspects described herein (e.g., performing intra-CSG handover, etc.).

It will be appreciated that memory 816, which can be a data store for example, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 816 of the subject systems and methods is intended to comprise, without being limited to, these and any other suitable types of memory.

Processor 814 is further optionally coupled to a CSG associating component 818, which can be similar to CSG associating component 212, a CSG determining component 820, which can be similar to CSG determining component 214, and/or a handover component 822, which can be similar to handover component 216 and/or 220. Processor 814 can further be optionally coupled to a measurement report receiving component 824, which can be similar to measurement report receiving component 218, a membership information receiving component 826, which can be similar to membership information receiving component 222, and/or a membership information verifying component 828, which can be similar to membership information verifying component 224.

Moreover, for example, processor 814 can modulate signals to be transmitted using modulator 830, and transmit modulated signals using transmitter 832. Transmitter 832 can transmit signals to mobile devices 804 over Tx antennas 808. Furthermore, although depicted as being separate from the processor 814, it is to be appreciated that the CSG associating component 818, CSG determining component 820, handover component 822, measurement report receiving component 824, measurement information receiving component 826, measurement information verifying component 828, demodulator 812, and/or modulator 830 can be part of the processor 814 or multiple processors (not shown), and/or stored as instructions in memory 816 for execution by processor 814.

Figure 9:
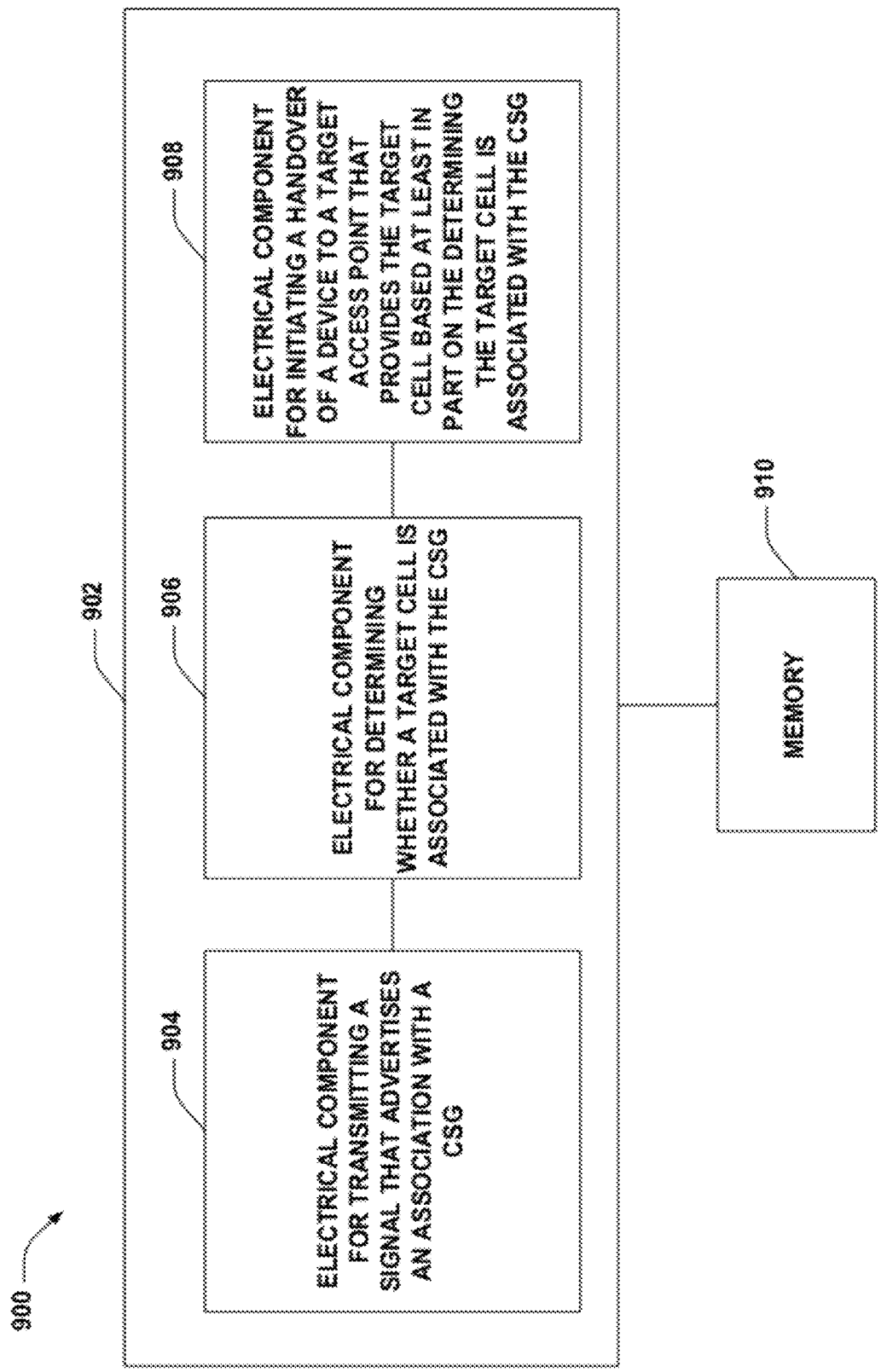
FIG. 9 is a block diagram of an aspect of a system that initiates handover based at least in part on CSG membership of an access point.

With reference to FIG. 9, illustrated is a system 900 that initiates intra-CSG handover. For example, system 900 can reside at least partially within a base station, device, etc. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include an electrical component for transmitting a signal that advertises an association with a CSG 904. As described, this can include transmitting one or more broadcast signals comprising an identifier of the CSG, an indicator of an access mode, and/or the like. Further, logical grouping 902 can comprise an electrical component for determining whether a target cell is associated with the CSG 906.

For example, an identifier of the CSG can be received in a measurement report from a device, in a signal from the target cell, in information from a core network component, and/or the like, and electrical component 906 can compare the identifier to an identifier of the advertised CSG. Moreover, logical grouping 902 can include an electrical component for initiating a handover of a device to a target access point that provides the target cell based at least in part on the determining the target cell is associated with the CSG 908. As described, this can include at least one of initiating the handover based also on whether the device is a member of the CSG, including CSG membership information in initiating the handover, and/ or the like.

For example, electrical component 904 can include a CSG advertising component 212, as described above. In addition, for example, electrical component 906, in an aspect, can include a CSG determining component 214, as described above. Moreover, electrical component 908 can include a handover component 216, as described. Additionally, system 900 can include a memory 910 that retains instructions for executing functions associated with the electrical components 904, 906, and 908. While shown as being external to memory 910, it is to be understood that one or more of the electrical components 904, 906, and 908 can exist within memory 910.

In one example, electrical components 904, 906, and 908 can comprise at least one processor, or each electrical component 904, 906, and 908 can be a corresponding module of at least one processor. Moreover, in an additional or alternative example, electrical components 904, 906, and 908 can be a computer program product comprising a computer readable medium, where each electrical component 904, 906, and 908 can be corresponding code.

Figure 10:
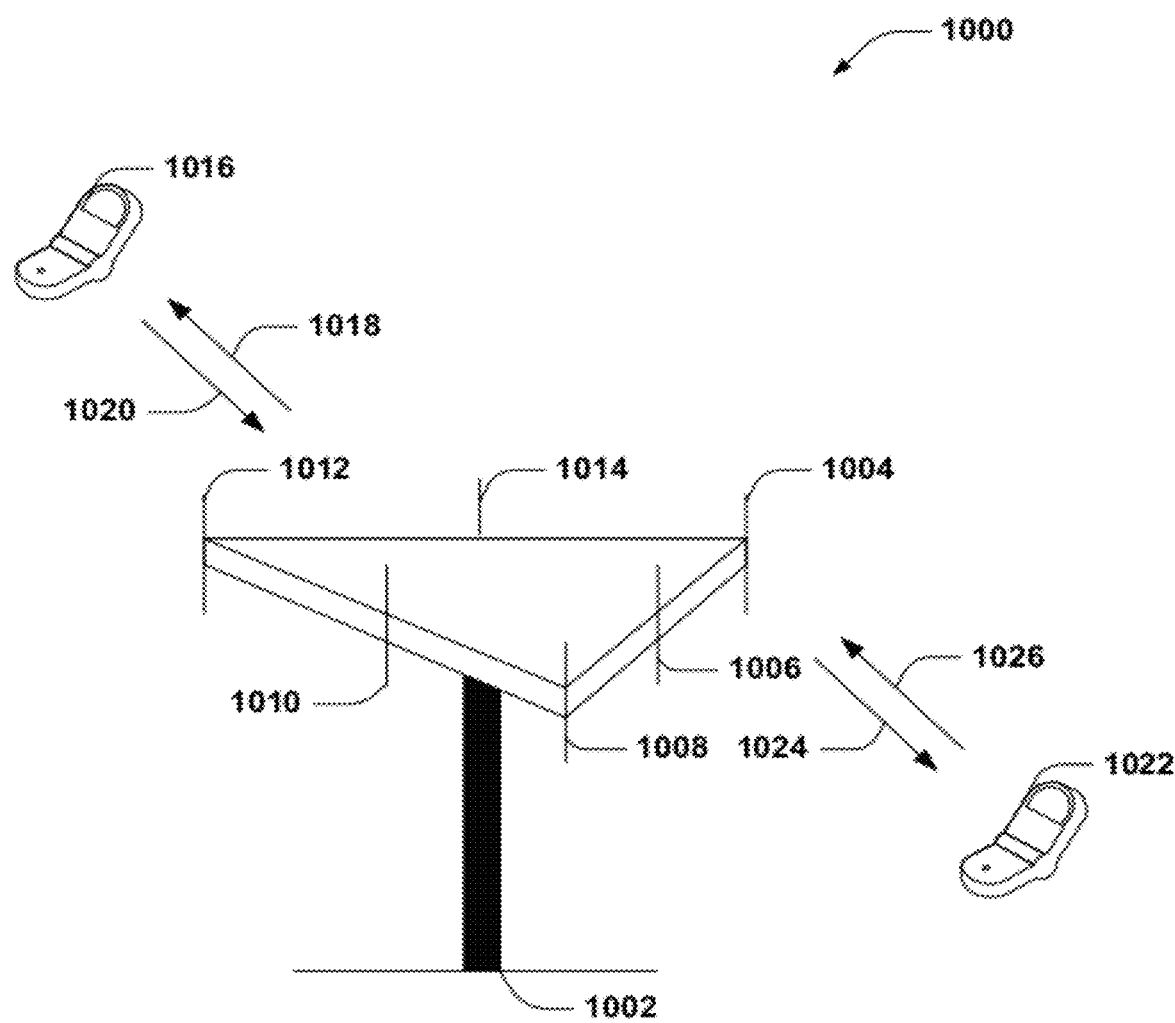
FIG. 10 is a block diagram of an aspect of a wireless communication system in accordance with various aspects set forth herein.

Referring now to FIG. 10, a wireless communication system 1000 is illustrated in accordance with various embodiments presented herein. System 1000 comprises a base station 1002 that can include multiple antenna groups. For example, one antenna group can include antennas 1004 and 1006, another group can comprise antennas 1008 and 1010, and an additional group can include antennas 1012 and 1014. Two antennas are illustrated for each antenna group; however, more or fewer antennas can be utilized for each group. Base station 1002 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 1002 can communicate with one or more mobile devices such as mobile device 1016 and mobile device 1022; however, it is to be appreciated that base station 1002 can communicate with substantially any number of mobile devices similar to mobile devices 1016 and 1022. Mobile devices 1016 and 1022 can be, for example, cellular phones, smart phones, laptops, handheld communication devices, handheld computing devices, satellite radios, global positioning systems, PDAs, and/or any other suitable device for communicating over wireless communication system 1000. As depicted, mobile device 1016 is in communication with antennas 1012 and 1014, where antennas 1012 and 1014 transmit information to mobile device 1016 over a forward link 1018 and receive information from mobile device 1016 over a reverse link 1020. Moreover, mobile device 1022 is in communication with antennas 1004 and 1006, where antennas 1004 and 1006 transmit information to mobile device 1022 over a forward link 1024 and receive information from mobile device 1022 over a reverse link 1026. In a frequency division duplex (FDD) system, forward link 1018 can utilize a different frequency band than that used by reverse link 1020, and forward link 1024 can employ a different frequency band than that employed by reverse link 1026, for example. Further, in a time division duplex (TDD) system, forward link 1018 and reverse link 1020 can utilize a common frequency band and forward link 1024 and reverse link 1026 can utilize a common frequency band.

Each group of antennas and/or the area in which they are designated to communicate can be referred to as a sector of base station 1002. For example, antenna groups can be designed to communicate to mobile devices in a sector of the areas covered by base station 1002. In communication over forward links 1018 and 1024, the transmitting antennas of base station 1002 can utilize beamforming to improve signal-to-noise ratio of forward links 1018 and 1024 for mobile devices 1016 and 1022. Also, while base station 1002 utilizes beamforming to transmit to mobile devices 1016 and 1022 scattered randomly through an associated coverage, mobile devices in neighboring cells can be subject to less interference as compared to a base station transmitting through a single antenna to all its mobile devices. Moreover, mobile devices 1016 and 1022 can communicate directly with one another using a peer-to-peer or ad hoc technology as depicted. According to an example, system 1000 can be a multiple-input multiple-output (MIMO) communication system.

Figure 11:
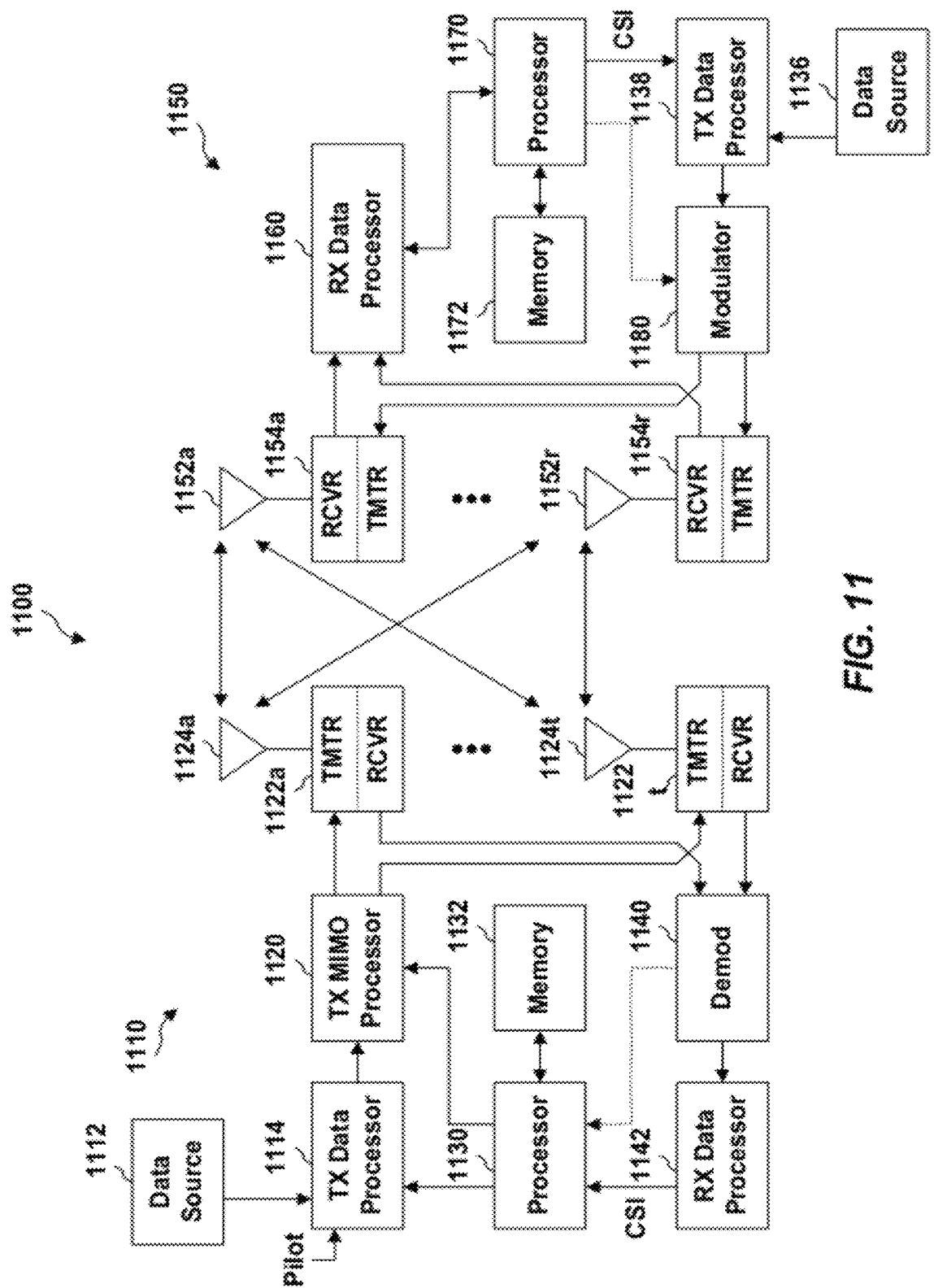
FIG. 11 is a schematic block diagram of an aspect of a wireless network environment that can be employed in conjunction with the various systems and methods described herein.

FIG. 11 shows an example wireless communication system 1100. The wireless communication system 1100 depicts one base station 1110 and one mobile device 1150 for sake of brevity. However, it is to be appreciated that system 1100 can include more than one base station and/or more than one mobile device, wherein additional base stations and/or mobile devices can be substantially similar or different from example base station 1110 and mobile device 1150 described below. In addition, it is to be appreciated that base station 1110 and/or mobile device 1150 can employ the systems (FIGS. 1-3 and 9-10), methods (FIGS. 4-7), and/or mobile devices (FIG. 8) described herein to facilitate wireless communication therebetween. For example, components or functions of the systems and/or methods described herein can be part of a memory 1132 and/or 1172 or processors 1130 and/or 1170 described below, and/or can be executed by processors 1130 and/or 1170 to perform the disclosed functions.

At base station 1110, traffic data for a number of data streams is provided from a data source 1112 to a transmit (TX) data processor 1114. According to an example, each data stream can be transmitted over a respective antenna. TX data processor 1114 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1150 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1130.

The modulation symbols for the data streams can be provided to a TX MIMO processor 1120, which can further process the modulation symbols (e.g., for OFDM). TX MIMO processor 1120 then provides $N_T$ modulation symbol streams to $N_T$ transmitters (TMTR) 1122a through 1122t. In various embodiments, TX MIMO processor 1120 applies beamforming weights to the symbols of the data streams and to the antenna from which the symbol is being transmitted.

Each transmitter 1122 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1122a through 1122t are transmitted from $N_T$ antennas 1124a through 1124t, respectively.

At mobile device 1150, the transmitted modulated signals are received by $N_R$ antennas 1152a through 1152r and the received signal from each antenna 1152 is provided to a respective receiver (RCVR) 1154a through 1154r. Each receiver 1154 conditions (e.g., filters, amplifies, and downconverts) a respective signal, digitizes the conditioned signal to provide samples, and further processes the samples to provide a corresponding "received" symbol stream.

An RX data processor 1160 can receive and process the $N_R$ received symbol streams from $N_R$ receivers 1154 based on a particular receiver processing technique to provide $N_T$ "detected" symbol streams. RX data processor 1160 can demodulate, deinterleave, and decode each detected symbol stream to recover the traffic data for the data stream. The processing by RX data processor 1160 is complementary to that performed by TX MIMO processor 1120 and TX data processor 1114 at base station 1110.

The reverse link message can comprise various types of information regarding the communication link and/or the received data stream. The reverse link message can be processed by a TX data processor 1138, which also receives traffic data for a number of data streams from a data source 1136, modulated by a modulator 1180, conditioned by transmitters 1154a through 1154r, and transmitted back to base station 1110.

At base station 1110, the modulated signals from mobile device 1150 are received by antennas 1124, conditioned by receivers 1122, demodulated by a demodulator 1140, and processed by a RX data processor 1142 to extract the reverse link message transmitted by mobile device 1150. Further, processor 1130 can process the extracted message to determine which precoding matrix to use for determining the beamforming weights.

Processors 1130 and 1170 can direct (e.g., control, coordinate, manage, etc.) operation at base station 1110 and mobile device 1150, respectively. Respective processors 1130 and 1170 can be associated with memory 1132 and 1172 that store program codes and data. Processors 1130 and 1170 can also perform computations to derive frequency and impulse response estimates for the uplink and downlink, respectively.

Figure 12:
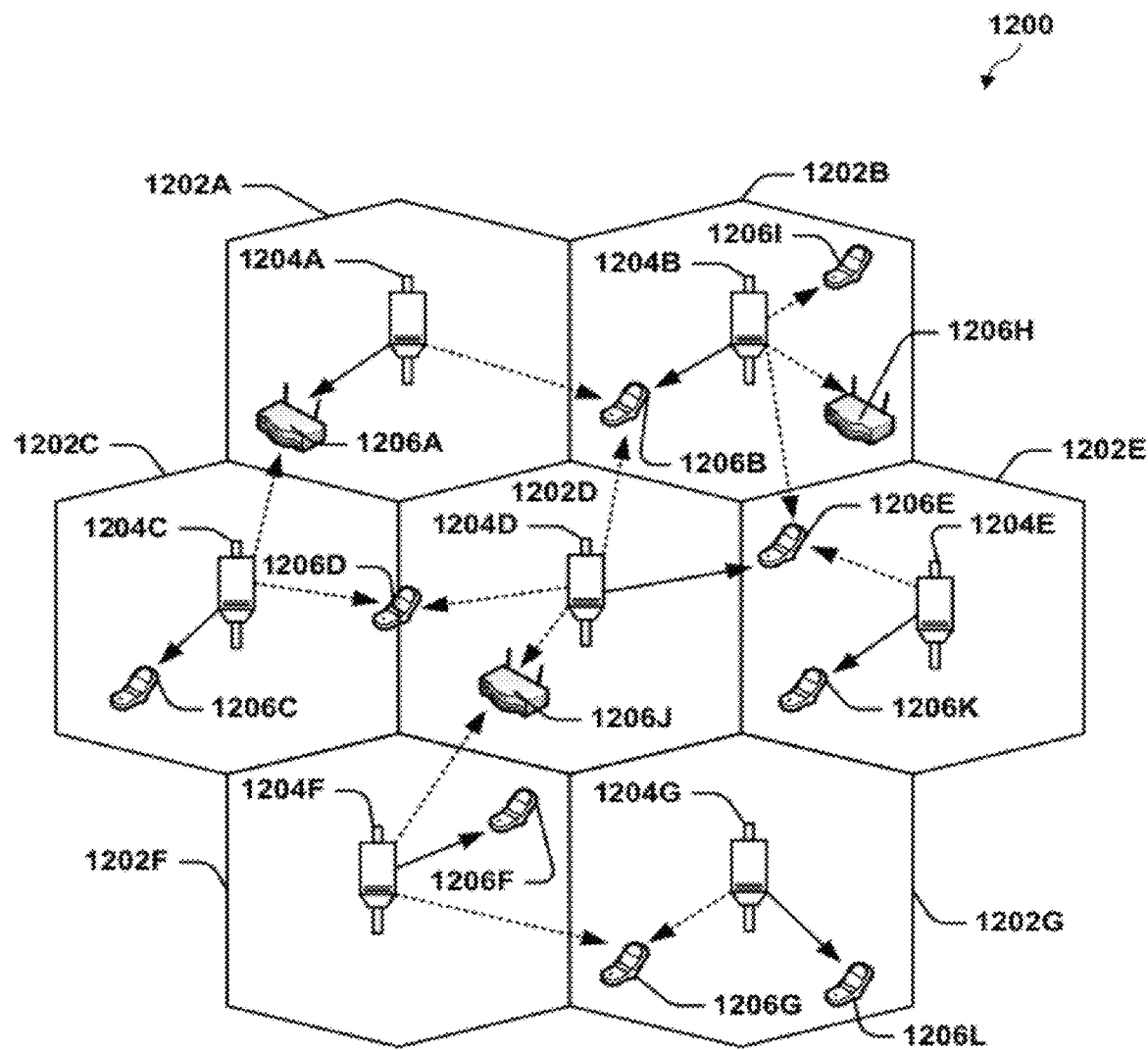
FIG. 12 a schematic diagram of an aspect of a wireless communication system, configured to support a number of devices, in which the aspects herein can be implemented.

FIG. 12 illustrates a wireless communication system 1200, configured to support a number of users, in which the teachings herein may be implemented. The system 1200 provides communication for multiple cells 1202, such as, for example, macro cells 1202A-1202G, with each cell being serviced by a corresponding access node 1204 (e.g., access nodes 1204A-1204G). As shown in FIG. 12, access terminals 1206 (e.g., access terminals 1206A-1206L) can be dispersed at various locations throughout the system over time. Each access terminal 1206 can communicate with one or more access nodes 1204 on a forward link (FL) and/or a reverse link (RL) at a given moment, depending upon whether the access terminal 1206 is active and whether it is in soft handoff, for example. The wireless communication system 1200 can provide service over a large geographic region.

Figure 13:
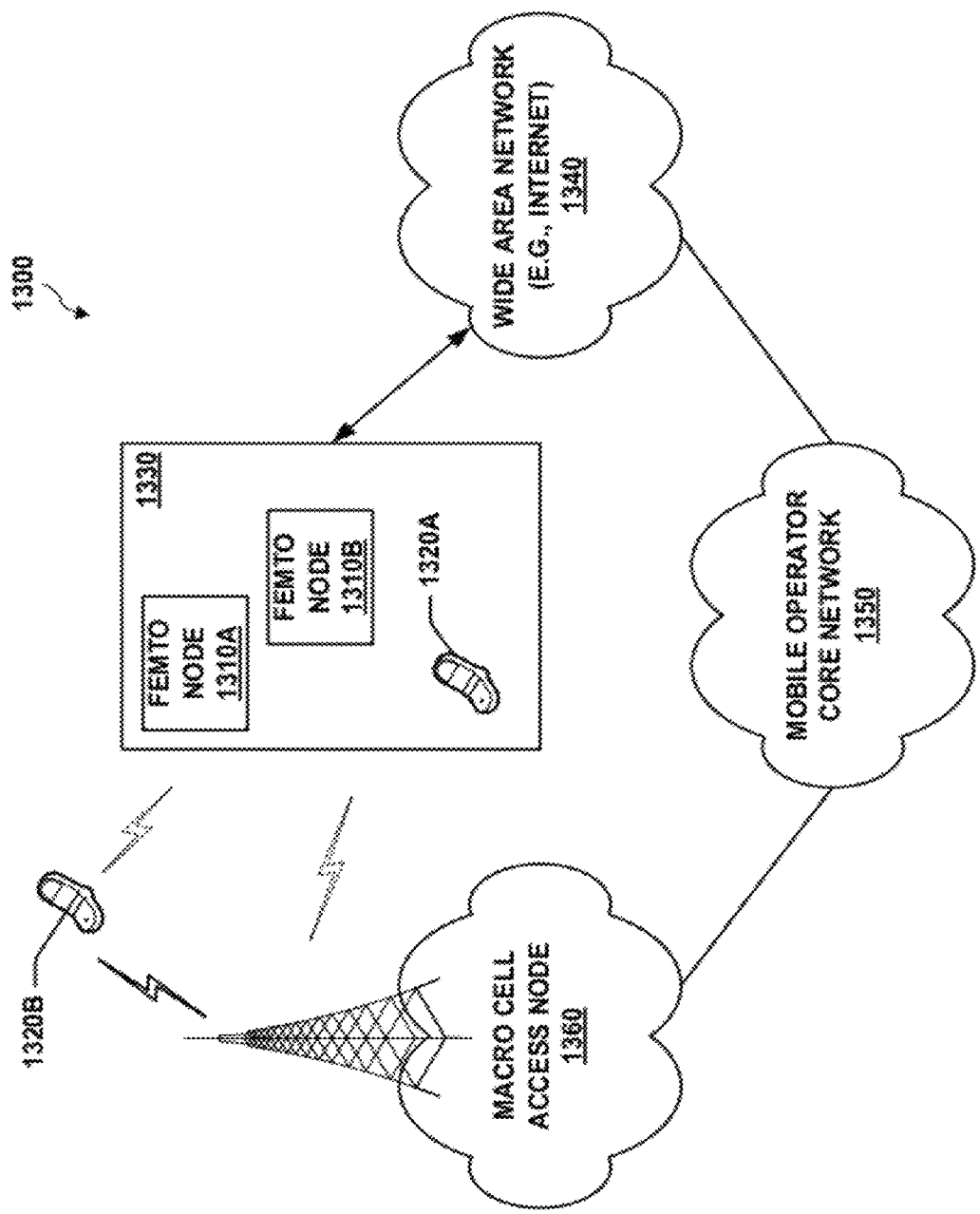
FIG. 13 is a schematic diagram of an aspect of a communication system to enable deployment of femtocells within a network environment.

FIG. 13 illustrates an exemplary communication system 1300 where one or more femto nodes are deployed within a network environment. Specifically, the system 1300 includes multiple femto nodes 1310A and 1310B (e.g., femtocell nodes or H(e)NB) installed in a relatively small scale network environment (e.g., in one or more user residences 1330). Each femto node 1310 can be coupled to a wide area network 1340 (e.g., the Internet) and a mobile operator core network 1350 via a digital subscriber line (DSL) router, a cable modem, a wireless link, or other connectivity means (not shown). As will be discussed below, each femto node 1310 can be configured to serve associated access terminals 1320 (e.g., access terminal 1320A) and, optionally, alien access terminals 1320 (e.g., access terminal 1320B). In other words, access to femto nodes 1310 can be restricted such that a given access terminal 1320 can be served by a set of designated (e.g., home) femto node(s) 1310 but may not be served by any non-designated femto nodes 1310 (e.g., a neighbor's femto node).

FIG. 14 illustrates an example of a coverage map 1400 where several tracking areas 1402 (or routing areas or location areas) are defined, each of which includes several macro coverage areas 1404. Here, areas of coverage associated with tracking areas 1402A, 1402B, and 1402C are delineated by the wide lines and the macro coverage areas 1404 are represented by the hexagons. The tracking areas 1402 also include femto coverage areas 1406. In this example, each of the femto coverage areas 1406 (e.g., femto coverage area 1406C) is depicted within a macro coverage area 1404 (e.g., macro coverage area 1404B). It should be appreciated, however, that a femto coverage area 1406 may not lie entirely within a macro coverage area 1404. In practice, a large number of femto coverage areas 1406 can be defined with a given tracking area 1402 or macro coverage area 1404. Also, one or more pico coverage areas (not shown) can be defined within a given tracking area 1402 or macro coverage area 1404.

Referring again to FIG. 13, the owner of a femto node 1310 can subscribe to mobile service, such as, for example, 3G mobile service, offered through the mobile operator core network 1350. In addition, an access terminal 1320 can be capable of operating both in macro environments and in smaller scale (e.g., residential) network environments. Thus, for example, depending on the current location of the access terminal 1320, the access terminal 1320 can be served by an access node 1360 or by any one of a set of femto nodes 1310 (e.g., the femto nodes 1310A and 1310B that reside within a corresponding user residence 1330). For example, when a subscriber is outside his home, he is served by a standard macro cell access node (e.g., node 1360) and when the subscriber is at home, he is served by a femto node (e.g., node 1310A). Here, it should be appreciated that a femto node 1310 can be backward compatible with existing access terminals 1320.

A femto node 1310 can be deployed on a single frequency or, in the alternative, on multiple frequencies. Depending on the particular configuration, the single frequency or one or more of the multiple frequencies can overlap with one or more frequencies used by a macro cell access node (e.g., node 1360). In some aspects, an access terminal 1320 can be configured to connect to a preferred femto node (e.g., the home femto node of the access terminal 1320) whenever such connectivity is possible. For example, whenever the access terminal 1320 is within the user's residence 1330, it can communicate with the home femto node 1310.

In some aspects, if the access terminal 1320 operates within the mobile operator core network 1350 but is not residing on its most preferred network (e.g., as defined in a preferred roaming list), the access terminal 1320 can continue to search for the most preferred network (e.g., femto node 1310) using a Better System Reselection (BSR), which can involve a periodic scanning of available systems to determine whether better systems are currently available, and subsequent efforts to associate with such preferred systems. Using an acquisition table entry (e.g., in a preferred roaming list), in one example, the access terminal 1320 can limit the search for specific band and channel. For example, the search for the most preferred system can be repeated periodically. Upon discovery of a preferred femto node, such as femto node 1310, the access terminal 1320 selects the femto node 1310 for camping within its coverage area.

A femto node can be restricted in some aspects. For example, a given femto node can only provide certain services to certain access terminals. In deployments with so-called restricted (or closed) association, a given access terminal can only be served by the macro cell mobile network and a defined set of femto nodes (e.g., the femto nodes 1310 that reside within the corresponding user residence 1330). In some implementations, a femto node can be restricted to not provide, for at least one access terminal, at least one of: signaling, data access, registration, paging, or service.

In some aspects, a restricted femto node (which can also be referred to as a Closed Subscriber Group H(e)NB) is one that provides service to a restricted provisioned set of access terminals. This set can be temporarily or permanently extended as necessary. In some aspects, a Closed Subscriber Group (CSG) can be defined as the set of access nodes (e.g., femto nodes) that share a common access control list of access terminals. A channel on which all femto nodes (or all restricted femto nodes) in a region operate can be referred to as a femto channel.

Various relationships can thus exist between a given femto node and a given access terminal. For example, from the perspective of an access terminal, an open femto node can refer to a femto node with no restricted association. A restricted femto node can refer to a femto node that is restricted in some manner (e.g., restricted for association and/or registration). A home femto node can refer to a femto node on which the access terminal is authorized to access and operate on. A guest femto node can refer to a femto node on which an access terminal is temporarily authorized to access or operate on. An alien femto node can refer to a femto node on which the access terminal is not authorized to access or operate on, except for perhaps emergency situations (e.g., 911 calls).

From a restricted femto node perspective, a home access terminal can refer to an access terminal that authorized to access the restricted femto node. A guest access terminal can refer to an access terminal with temporary access to the restricted femto node. An alien access terminal can refer to an access terminal that does not have permission to access the restricted femto node, except for perhaps emergency situations, for example, 911 calls (e.g., an access terminal that does not have the credentials or permission to register with the restricted femto node).

For convenience, the disclosure herein describes various functionality in the context of a femto node. It should be appreciated, however, that a pico node can provide the same or similar functionality as a femto node, but for a larger coverage area. For example, a pico node can be restricted, a home pico node can be defined for a given access terminal, and so on.

A wireless multiple-access communication system can simultaneously support communication for multiple wireless access terminals. As mentioned above, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out system, a MIMO system, or some other type of system.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for performing intra-closed subscriber group (CSG) handover, comprising:
   transmitting a signal that advertises an association with a CSG using a transmitter;
   determining that a target cell is associated with the CSG; and
   initiating a handover of a device to a target access point that provides the target cell based at least in part on the determining that the target cell is associated with the CSG.

2. The method of claim 1, wherein the initiating the handover comprises transmitting a relocation request or a handover request to the target access point.

3. The method of claim 2, further comprising:
   determining that the target cell is a hybrid cell; and
   indicating whether the device is a member of the CSG in the relocation request or the handover request based at least in part on the determining that the target cell is the hybrid cell.

4. The method of claim 3, further comprising:
   receiving a CSG identifier, a physical cell identifier, or an access mode from the device; and
   including the CSG identifier, the physical cell identifier, or the access mode from the device in the relocation request or the handover request based at least in part on the determining that the target cell is the hybrid cell.

5. The method of claim 1, further comprising determining the target cell is a closed cell, wherein the initiating the handover of the device is further based at least in part on determining the target cell is the closed cell.

6. The method of claim 1, wherein the determining includes determining that the target cell is associated with the CSG based at least in part on comparing a CSG identifier corresponding to the target access point with an identifier of the CSG.

7. The method of claim 6, further comprising receiving a measurement report from the device, wherein the measurement report comprises the CSG identifier corresponding to the target access point.

8. The method of claim 6, further comprising receiving the CSG identifier from a broadcast signal transmitted by the target access point.

9. The method of claim 1, wherein the initiating the handover comprises communicating with the target access point over an X2 interface.

10. An apparatus for performing intra-closed subscriber group (CSG) handover, comprising:
    at least one processor configured to:
       transmit a signal that advertises an association with a CSG;
       determine that a target cell is associated with the CSG; and
       initiate handover of a device to a target access point that provides the target cell based at least in part on the target cell being associated with the CSG; and
    a memory coupled to the at least one processor.

11. The apparatus of claim 10, wherein the at least one processor initiates the handover at least in part by transmitting a relocation request or a handover request to the target access point.

12. The apparatus of claim 11, wherein the at least one processor is further configured to:
    determine that the target cell is a hybrid cell; and
    indicate whether the device is a member of the CSG in the relocation request or the handover request based at least in part on the target cell being the hybrid cell.

13. The apparatus of claim 12, wherein the at least one processor is further configured to:
    obtain a CSG identifier, a physical cell identifier, or an access mode from the device; and
    specifying the CSG identifier, the physical cell identifier, or the access mode in the relocation request or the handover request based at least in part on the target cell being the hybrid cell.

14. The apparatus of claim 10, wherein the at least one processor is further configured to determine the target cell is a closed cell, and wherein the at least one processor initiates the handover of the device further based at least in part on the target cell being the closed cell.

15. The apparatus of claim 10, wherein the at least one processor determines that the target cell is associated with the CSG based at least in part comparing a CSG identifier corresponding to the target access point to an identifier of the CSG.

16. The apparatus of claim 15, wherein the at least one processor is further configured to receive a measurement report from the device comprising the CSG identifier corresponding to the target access point.

17. The apparatus of claim 15, wherein the at least one processor is further configured to receive the CSG identifier from a broadcast signal transmitted by the target access point.

18. The apparatus of claim 10, wherein the at least one processor initiates the handover at least in part by communicating with the target access point over an X2 interface.

19. An apparatus for performing intra-closed subscriber group (CSG) handover, comprising:
    means for transmitting a signal that advertises an association with a CSG;
    means for determining that a target cell is associated with the CSG; and
    means for initiating a handover of a device to a target access point that provides the target cell based at least in part on determining the target cell is associated with the CSG.

20. The apparatus of claim 19, wherein the means for initiating initiates the handover at least in part by transmitting a relocation request or a handover request to the target access point.

21. The apparatus of claim 20, wherein the means for initiating determines the target cell is a hybrid cell and indicates whether the device is a member of the CSG in the relocation request or the handover request based on determining the target cell is the hybrid cell.

22. The apparatus of claim 21, further comprising means for receiving a CSG identifier, a physical cell identifier, or an access mode from the device, wherein the means for indicating specifies the CSG identifier, the physical cell identifier, or the access mode in the relocation request or the handover request based on determining the target cell is the hybrid cell.

23. The apparatus of claim 19, wherein the means for initiating determines the target cell is a closed cell, and initiates the handover based at least in part on determining that the target cell is the closed cell.

24. The apparatus of claim 19, wherein the means for determining determines that the target cell is associated with the CSG based at least in part on comparing a CSG identifier corresponding to the target access point to an identifier of the CSG.

25. The apparatus of claim 24, further comprising means for receiving a measurement report from the device, wherein the means for determining obtains the CSG identifier from the measurement report.

26. The apparatus of claim 24, wherein the means for determining receives the CSG identifier from a broadcast signal transmitted by the target access point.

27. The apparatus of claim 19, wherein the means for initiating initiates the handover at least in part by communicating with the target access point over an X2 interface.

28. A computer program product for performing intra-closed subscriber group (CSG) handover, comprising:
  a computer-readable medium, comprising:
    code for causing at least one computer to transmit a signal that advertises an association with a CSG;
    code for causing the at least one computer to determine whether a target cell is associated with the CSG; and
    code for causing the at least one computer to initiate handover of a device to a target access point that provides the target cell based at least in part on the determining whether the target cell is associated with the CSG.

29. The computer program product of claim 28, wherein the code for causing the at least one computer to initiate initiates the handover at least in part by transmitting a relocation request or a handover request to the target access point.

30. The computer program product of claim 29, wherein the computer-readable medium further comprises:
  code for causing the at least one computer to determine that the target cell is a hybrid cell; and
  code for causing the at least one computer to indicate whether the device is a member of the CSG in the relocation request or the handover request based at least in part on the target cell being the hybrid cell.

31. The computer program product of claim 30, wherein the computer-readable medium further comprises:
  code for causing the at least one computer to receive a CSG identifier, a physical cell identifier, or an access mode from the device; and
  specify the CSG identifier, the physical cell identifier, or the access mode in the relocation request or the handover request based at least in part on the target cell being the hybrid cell.

32. The computer program product of claim 28, wherein the computer-readable medium further comprises code for causing the at least one computer to determine the target cell is a closed cell, wherein the code for causing the at least one computer to initiate initiates handover of the device based at least in part on the target cell being the closed cell.

33. The computer program product of claim 28, wherein the code for causing the at least one computer to determine determines that the target cell is associated with the CSG based at least in part on comparing a CSG identifier corresponding to the target access point to an identifier of the CSG.

34. The computer program product of claim 33, wherein the computer-readable medium further comprises code for causing the at least one computer to receive a measurement report from the device comprising the CSG identifier corresponding to the target access point.

35. The computer program product of claim 33, wherein the computer-readable medium further comprises code for causing the at least one computer to receive the CSG identifier from a broadcast signal transmitted by the target access point.

36. The computer program product of claim 28, wherein the code for causing the at least one computer to initiate initiates the handover at least in part by communicating with the target access point over an X2 interface.

37. An apparatus for performing intra-closed subscriber group (CSG) handover, comprising:
  a CSG associating component for transmitting a signal that advertises an association with a CSG;
  a CSG determining component for determining whether a target cell is associated with the CSG; and
  a handover component for initiating a handover of a device to a target access point that provides the target cell based at least in part on the determining whether the target cell is associated with the CSG.

38. The apparatus of claim 37, wherein the handover component initiates the handover at least in part by transmitting a relocation request or a handover request to the target access point.

39. The apparatus of claim 38, wherein the handover component determines the target cell is a hybrid cell and indicates whether the device is a member of the CSG in the relocation request or the handover request based on determining the target cell is the hybrid cell.

40. The apparatus of claim 39, further comprising a measurement report receiving component for receiving a CSG identifier, a physical cell identifier, or an access mode from the device, wherein the handover component specifies the CSG identifier, the physical cell identifier, or the access mode in the relocation request or the handover request based on determining the target cell is the hybrid cell.

41. The apparatus of claim 37, wherein the handover component determines the target cell is a closed cell, and initiates the handover based at least in part on determining that the target cell is the closed cell.

42. The apparatus of claim 37, wherein the CSG determining component determines that the target cell is associated with the CSG based at least in part on comparing a CSG identifier corresponding to the target access point to an identifier of the CSG.

43. The apparatus of claim 42, further comprising a measurement report receiving component for receiving a measurement report from the device comprising the CSG identifier corresponding to the target access point.

44. The apparatus of claim 42, wherein the CSG determining component receives the CSG identifier from a broadcast signal transmitted by the target access point.

45. The apparatus of claim 37, wherein the handover component initiates the handover at least in part by communicating with the target access point over an X2 interface.

* * * * *